US012458292B2

(12) United States Patent
Mikhail et al.

(10) Patent No.: US 12,458,292 B2
(45) Date of Patent: Nov. 4, 2025

(54) SMART PLATE SENSORS

(71) Applicants: Depuy Synthes Products, Inc., Raynham, MA (US); Stichting IMEC Nederland, Eindhoven (NL)

(72) Inventors: George Mikhail, Downingtown, PA (US); Jochem Walser, Bottmingen (CH); Binh Vu, Thorndale, PA (US); Navid Shahriari, Rotterdam (NL); Erfan Sheikhi, Eindhoven (NL); Seulki Lee, Eindhoven (NL); Mark Fichman, Eindhoven (NL)

(73) Assignee: DEPUY SYNTHES PRODUCTS, INC., Raynham, MA (US)

(*) Notice: Subject to any disclaimer, the term of this patent is extended or adjusted under 35 U.S.C. 154(b) by 678 days.

(21) Appl. No.: 17/378,334

(22) Filed: Jul. 16, 2021

(65) Prior Publication Data

US 2023/0014988 A1 Jan. 19, 2023

(51) Int. Cl.
| | |
|---|---|
| A61B 5/00 | (2006.01) |
| A61B 5/01 | (2006.01) |
| A61B 5/06 | (2006.01) |

(52) U.S. Cl.
CPC .......... *A61B 5/6878* (2013.01); *A61B 5/0008* (2013.01); *A61B 5/01* (2013.01); *A61B 5/061* (2013.01); *A61B 5/4504* (2013.01); *A61B 5/742* (2013.01); *A61B 2560/0219* (2013.01); *A61B 2562/0252* (2013.01); *A61B 2562/16* (2013.01)

(58) Field of Classification Search
CPC ................ A61B 5/6878; A61B 5/4504; A61B 2560/0219
See application file for complete search history.

(56) References Cited

U.S. PATENT DOCUMENTS

| | | |
|---|---|---|
| 1,032,109 A | 7/1912 | Buckingham |
| 3,942,535 A | 3/1976 | Schulman |
| 5,324,315 A | 6/1994 | Grevious |
| 5,350,413 A | 9/1994 | Miller |

(Continued)

FOREIGN PATENT DOCUMENTS

| | | |
|---|---|---|
| EP | 2229757 B1 | 12/2016 |
| EP | 3355437 A1 | 8/2018 |

(Continued)

OTHER PUBLICATIONS

International Search Report & Written Opinion for PCT/IB2022/055549 mailed on Sep. 28, 2022.

(Continued)

*Primary Examiner* — Tammie K Marlen
(74) *Attorney, Agent, or Firm* — Kramer & Amado, P.C.

(57) ABSTRACT

A patient monitoring system, including: a bone plate configured to be secured to a bone; a plurality of sensors on the bone plate configured to: measure a parameter; transmit a data signal communicating the measured parameter value; and wherein the transmitted data signals from the plurality of sensors are time division multiplexed; and an external wireless reader including an antenna, a processor, and wireless communication radio, wherein the external wireless reader is configured to: transmit an modulated RF signal; and receive the time division multiplexed transmitted data signals from the plurality of sensors.

12 Claims, 9 Drawing Sheets

(56) References Cited

U.S. PATENT DOCUMENTS

| | | |
|---|---|---|
| 5,446,447 A | 8/1995 | Carney et al. |
| 5,702,431 A | 12/1997 | Wang et al. |
| 5,704,352 A | 1/1998 | Tremblay et al. |
| 5,725,578 A | 3/1998 | Knapp et al. |
| 5,833,603 A | 11/1998 | Kovacs et al. |
| 6,088,619 A | 7/2000 | Hein et al. |
| 6,708,065 B2 | 3/2004 | Von Arx et al. |
| 7,072,718 B2 | 7/2006 | Von Arx et al. |
| 7,079,900 B2 | 7/2006 | Greenburg et al. |
| 7,187,978 B2 | 3/2007 | Malek et al. |
| 7,228,175 B2 | 6/2007 | Jain et al. |
| 7,256,695 B2 | 8/2007 | Hamel et al. |
| 7,286,881 B2 | 10/2007 | Schommer et al. |
| 7,392,092 B2 | 6/2008 | Li et al. |
| 7,483,752 B2 | 1/2009 | Von Arx et al. |
| 7,486,048 B2 | 2/2009 | Tsukamoto et al. |
| 7,701,878 B2 | 4/2010 | Mora |
| 7,774,069 B2 | 8/2010 | Olson et al. |
| 7,786,867 B2 | 8/2010 | Hamel et al. |
| 7,878,207 B2 | 2/2011 | Goetz et al. |
| 7,932,696 B2 | 4/2011 | Peterson |
| 8,140,168 B2 | 3/2012 | Olson et al. |
| 8,188,619 B2 | 5/2012 | AZancot et al. |
| 8,195,305 B2 | 6/2012 | Nghiem et al. |
| 8,311,638 B2 | 11/2012 | Aghassian |
| 8,369,959 B2 | 2/2013 | Meskens |
| 8,386,048 B2 | 2/2013 | McClure et al. |
| 8,416,088 B2 | 4/2013 | Ortega et al. |
| 8,439,821 B2 | 5/2013 | Stiller et al. |
| 8,463,394 B2 | 6/2013 | Forsell |
| 8,473,066 B2 | 6/2013 | Aghassian et al. |
| 8,498,713 B2 | 7/2013 | McClure et al. |
| 8,502,675 B2 | 8/2013 | Hamel et al. |
| 8,509,909 B2 | 8/2013 | Figueiredo et al. |
| 8,612,013 B2 | 12/2013 | Forsell |
| 8,700,175 B2 | 4/2014 | Fell |
| 8,755,899 B2 | 6/2014 | Von Arx et al. |
| 8,798,756 B2 | 8/2014 | McClure et al. |
| 8,938,305 B2 | 1/2015 | Abrahamson et al. |
| 8,965,523 B2 | 2/2015 | Forsell |
| 9,042,985 B2 | 5/2015 | Marsh et al. |
| 9,089,717 B2 | 7/2015 | Forsell |
| 9,095,709 B2 | 8/2015 | McClure et al. |
| 9,108,056 B2 | 8/2015 | McClure et al. |
| 9,125,242 B2 | 9/2015 | Budgett |
| 9,205,269 B2 | 12/2015 | Marsh et al. |
| 9,227,075 B2 | 1/2016 | Aghassian et al. |
| 9,240,633 B2 | 1/2016 | Shi et al. |
| 9,339,660 B2 | 5/2016 | Feldman et al. |
| 9,381,354 B2 | 7/2016 | Roy et al. |
| 9,446,254 B2 | 9/2016 | Ozawa et al. |
| 9,526,895 B2 | 12/2016 | McClure et al. |
| 9,533,162 B2 | 1/2017 | Ter-Petrosyan et al. |
| 9,536,656 B2 | 1/2017 | Oettinger et al. |
| 9,597,516 B2 | 3/2017 | Lee et al. |
| 9,764,134 B2 | 9/2017 | McClure et al. |
| 9,792,469 B1 | 10/2017 | Park |
| 9,821,160 B2 | 11/2017 | Roy et al. |
| 9,825,471 B2 | 11/2017 | Hansen |
| 9,872,997 B2 | 1/2018 | Angara et al. |
| 9,878,170 B2 | 1/2018 | Angara et al. |
| 9,887,574 B2 | 2/2018 | Angara et al. |
| 9,913,990 B2 | 3/2018 | Ter-Petrosyan et al. |
| 9,919,156 B2 | 3/2018 | McClure et al. |
| 9,997,928 B2 | 6/2018 | Petersen et al. |
| 10,016,602 B2 | 7/2018 | Khalil et al. |
| 10,052,481 B2 | 8/2018 | McClure et al. |
| 10,194,802 B2 | 2/2019 | Windolf |
| 10,199,884 B2 | 2/2019 | Angara et al. |
| 10,226,637 B2 | 3/2019 | Aghassian et al. |
| 10,285,641 B2 | 5/2019 | Kang et al. |
| 10,311,662 B2 | 6/2019 | Westby et al. |
| 10,362,982 B2 | 7/2019 | Stevenson et al. |
| 10,363,426 B2 | 7/2019 | Aghassian et al. |
| 10,413,738 B2 | 9/2019 | Ter-Petrosyan et al. |
| 10,525,181 B2 | 1/2020 | Petersen |
| 10,603,501 B2 | 3/2020 | Aghassian et al. |
| 10,617,880 B2 | 4/2020 | Zellmer et al. |
| 10,625,078 B2 | 4/2020 | McClure et al. |
| 10,632,318 B2 | 4/2020 | Stouffer |
| 10,665,043 B2 | 5/2020 | Westby et al. |
| 10,665,044 B2 | 5/2020 | Westby et al. |
| 10,665,045 B2 | 5/2020 | Westby et al. |
| 10,665,046 B2 | 5/2020 | Westby et al. |
| 2005/0113887 A1 | 5/2005 | Bauhahn et al. |
| 2005/0222624 A1 | 10/2005 | Greenberg et al. |
| 2006/0052782 A1* | 3/2006 | Morgan ............ A61B 5/14539 606/60 |
| 2006/0235485 A1 | 10/2006 | Ok et al. |
| 2008/0154337 A1 | 6/2008 | McClure et al. |
| 2008/0262376 A1 | 10/2008 | Price |
| 2009/0259273 A1 | 10/2009 | Figueiredo et al. |
| 2010/0331683 A1 | 12/2010 | Stein |
| 2012/0296234 A1 | 11/2012 | Wilhelm |
| 2016/0063286 A1 | 3/2016 | Nikunen |
| 2016/0328637 A1 | 11/2016 | Viikari |
| 2017/0361115 A1 | 12/2017 | Aghassian et al. |
| 2017/0361116 A1 | 12/2017 | Aghassian et al. |
| 2018/0055444 A1 | 3/2018 | Windolf |
| 2018/0078329 A1 | 3/2018 | Hansen et al. |
| 2018/0345025 A1 | 12/2018 | Stinauer et al. |
| 2019/0009097 A1 | 1/2019 | Hartley et al. |
| 2019/0038214 A1 | 2/2019 | Mikhail et al. |
| 2019/0298485 A1 | 10/2019 | Forsell |
| 2020/0146624 A1 | 5/2020 | Flitsch |

FOREIGN PATENT DOCUMENTS

| | | |
|---|---|---|
| WO | 2000074747 A1 | 12/2000 |
| WO | 2001037926 A1 | 5/2001 |
| WO | 2009097485 A1 | 8/2009 |
| WO | 2010089354 A1 | 8/2010 |
| WO | 2012005603 A1 | 1/2012 |
| WO | 2019045681 A1 | 3/2019 |

OTHER PUBLICATIONS

Linkedin article re Guillaume Crinon; Global IoT Strategy Manager—Security & Connectivity at Avnet; Published on Aug. 22, 2017; 4 pgs.

* cited by examiner

SMART PLATE SENSORS

TECHNICAL FIELD

Various exemplary embodiments disclosed herein relate generally to smart plate sensors including simultaneous readouts from multiple sensors. Further smart place sensors may be used for inflammation and infection detection. Also the smart plates may have the ability to align the sensors with a reader for the sensor and be able to read the sensor adjacent to a metal plate.

BACKGROUND

Conventional bone fixation systems include a bone plate having screw holes that receive fixation members, such as screws that are configured to attach to underlying bone that includes, at a minimum, a pair of bone segments separated by a bone gap. The bone gap can be a fracture created by a traumatic event, an osteotomy, or can be the result of debridement of a joint of two discrete bones to be joined in an arthrodesis. Thus, the bone plate can be affixed to the bone on opposed sides of the bone gap via the bone screws to promote union of the bone segments (e.g., healing of the fracture or ossification of the joint). Bone fixation systems can further include temporary Kirschner wires (K-wires) that are temporarily inserted into apertures of the bone fixation plate and into the underlying bone segments to determine proper length, rotation, and alignment of the bone segments prior to permanent plate fixation. Once the bone fixation plate has been properly positioned, the permanent bone screws can be inserted into one or more bone screw holes on opposed sides of the bone gap and affixed to the underlying bone.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a patient monitoring system, including: a bone plate configured to be secured to a bone; a plurality of sensors on the bone plate configured to: measure a parameter; transmit a data signal communicating the measured parameter value; and wherein the transmitted data signals from the plurality of sensors are time division multiplexed; and an external wireless reader including an antenna, a processor, and wireless communication radio, wherein the external wireless reader is configured to: transmit a modulated RF signal; and receive the time division multiplexed transmitted data signals from the plurality of sensors.

Various embodiments are described, wherein the plurality of sensors harvest energy from the modulated RF signal to power the plurality of sensors.

Various embodiments are described, wherein the modulated RF signal has a periodic on-time and off-time, and the plurality of sensors are configured to measure the parameter when the falling edge of the on-time of the modulated RF signal is detected.

Various embodiments are described, wherein the modulated RF signal has a periodic on-time and off-time, and the plurality of sensors are configured to transmit the data signals when the leading edge of the on-time of the modulated RF signal is detected.

Various embodiments are described, wherein the plurality of sensors measure one of load, temperature, and position.

Various embodiments are described, wherein the plurality of sensor further include: an antenna; a controller configured to control the sensor; and modulator configured to produce the data signal.

Various embodiments are described, wherein the plurality of sensor further include: a rectifier configured to rectify the modulated RF signal; and an energy storage configured to store energy from the rectifier.

Various embodiments are described, wherein the plurality of sensors measure a voltage based upon the received modulated RF signal and transmit the measured voltage value to the external wireless reader, and wherein the external wireless reader is configured to: receive the measured voltage values from the plurality of sensors; compare the received voltage values to a sensor voltage profile; and generate instructions regarding moving the external wireless reader to improve the alignment between the plurality of sensors and the external wireless reader.

Various embodiments are described, wherein the external wireless reader is configured to display the instructions regarding moving the external wireless reader on a display.

Various embodiments are described, wherein the plurality of sensors are configured to measure temperature, and the reader is configured to detect the presence of inflammation or infection based upon the temperature measurements.

Various embodiments are described, wherein the plurality of sensors include a resonator circuit configured to harvest power from the modulated RF signal, and the parameters of the resonator circuit are based upon the distance between the plurality of sensors and the bone plate in order to achieve a desired resonant frequency associated with the wireless power transfer.

Various embodiments are described, wherein distance between the plurality of sensors and the bone plate is set by an electrically insulating layer between the plurality of sensors and the bone plate.

Further various embodiments relate to a method for monitoring a bone plate having a plurality of sensors, including: measuring, by the plurality of sensors, a parameter; transmitting, by the plurality of sensors, a data signal communicating the measured parameter value, wherein the transmitted data signals from the plurality of sensors are time division multiplexed; transmitting, by a reader, an modulated RF signal; and receiving, by the reader, the time division multiplexed transmitted data signals from the plurality of sensors.

Various embodiments are described, further including harvesting energy, from the plurality of sensors, from the modulated RF signal to power the plurality of sensors.

Various embodiments are described, wherein the modulated RF signal has a periodic on-time and off-time, further including measuring, by the plurality of sensors, the parameter when the falling edge of the on-time of the modulated RF signal is detected.

Various embodiments are described, wherein the modulated RF signal has a periodic on-time and off-time, further including transmitting, by the plurality of sensors, the data signals when the leading edge of the on-time of the modulated RF signal is detected.

Various embodiments are described, wherein the plurality of sensors measure one of load, temperature, and position.

Various embodiments are described, further including: measuring, by the plurality of sensors, a voltage based upon the received modulated RF signal; transmitting, by the plurality of sensors, the measured voltage value to the external wireless reader; receiving, by the reader, the measured voltage values from the plurality of sensors; comparing, by the reader, the received voltage values to a sensor voltage profile; and generating, by the reader, instructions regarding moving the external wireless reader to improve the alignment between the plurality of sensors and the external wireless reader.

Various embodiments are described, further including displaying, by the reader, the instructions regarding moving the external wireless reader on a display.

Various embodiments are described, further including, measuring, by the plurality of sensors, temperature; and detecting, by the reader, the presence of inflammation or infection based upon the temperature measurements.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Figure 1:
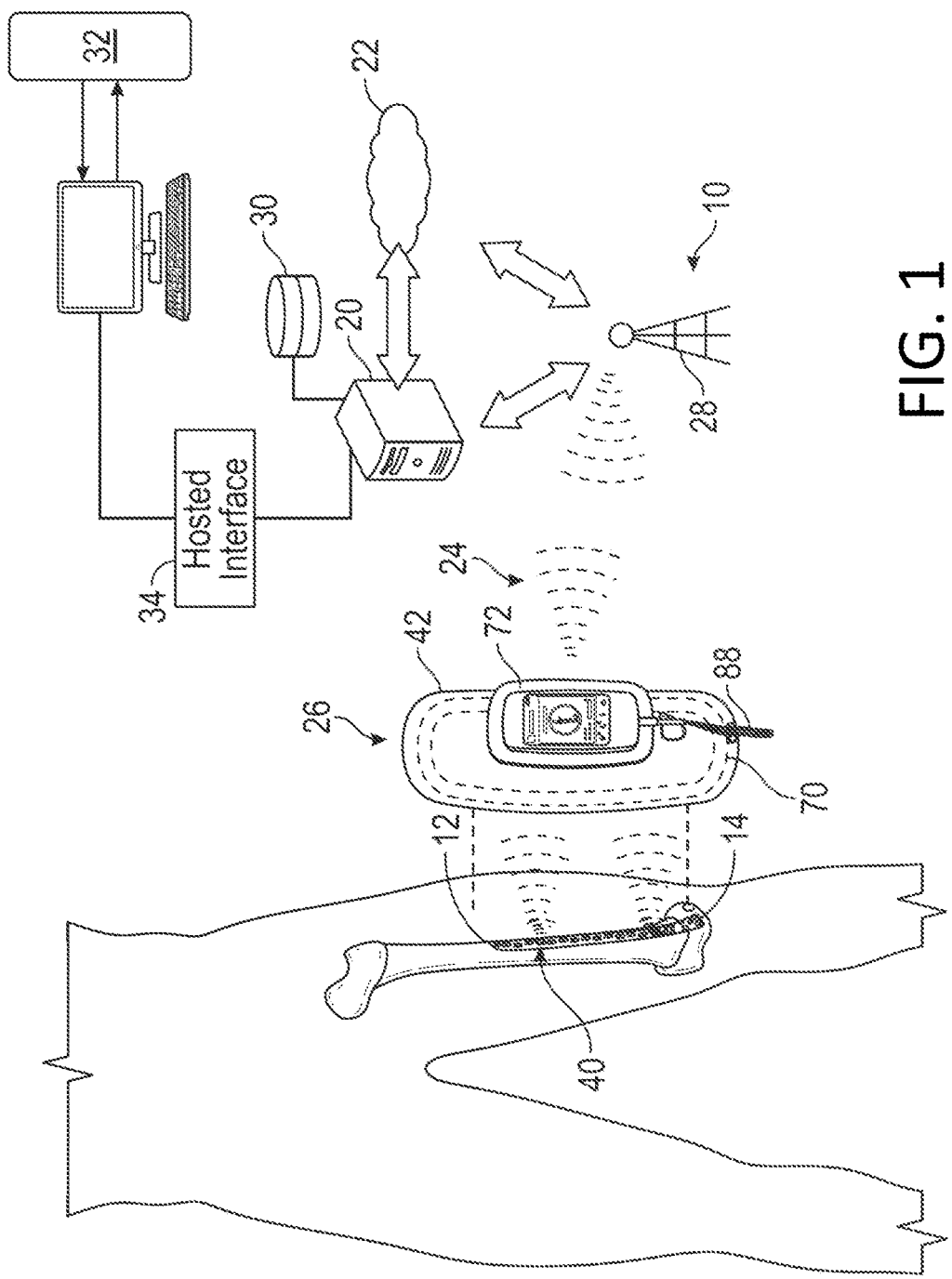
FIG. 1 is a schematic diagram of a system for monitoring the healing of a bone fracture.
Figure 2:
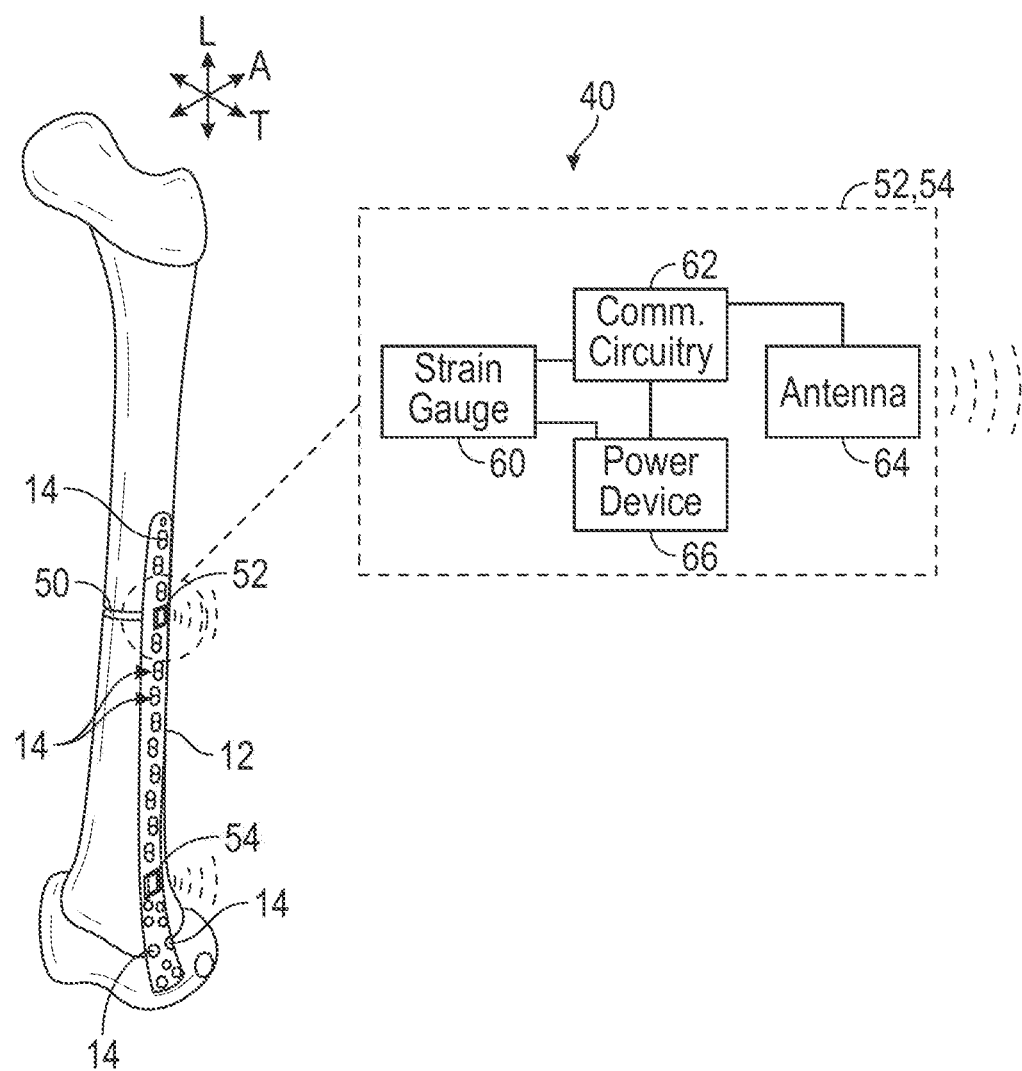
FIG. 2 is a schematic diagram of an implantable smart fixation device for surgically repairing a fractured bone.

Referring to the drawings, wherein like reference numerals are used to identify like or identical components in the various views, FIG. 1 schematically illustrates a system 10 for remotely monitoring the healing/ossification of a bone fracture or other bone joint that is internally fixated with a bone plate 12 and plurality of permanent fixation members such as bone screws 14 (as better shown in FIG. 2). In general, the present system 10 includes a data server 20 and/or cloud computing system 22 that is operative to receive patient data 24 from one or more patient monitoring systems 26 across a wireless communication network 28. The data server 20/cloud computing system 22 may store the received patient data 24 in an associated non-volatile memory/database 30 and may visually present this data to a medical professional 32 via a hosted physician interface 34. The patient monitoring system 26 may be configured to periodically monitor the amount of load carried by the bone plate 12 across the fracture throughout the duration of the healing process. This load measurement may be normalized against loads carried by the bone plate 12 away from the fracture and may be periodically transmitted from the patient monitoring system 26 to the data server 20 where it may be aggregated with other patient data 24 to highlight trends in the healing of the fracture.

With continuing reference to FIG. 1, the data server 20 may be implemented as one or more high-speed server computers or mainframe computing devices capable of handling bulk data processing and data visualization tasks. The cloud computing system 22, on the other hand, may operate as middleware for IoT (Internet of Things), WoT (Web of Things), and/or M2M (machine-to-machine) services, connecting an assortment of heterogeneous electronic devices with a service-oriented architecture (SOA) via a data network. As an example, cloud computing system 22 may be implemented as a middleware node to provide different functions for dynamically onboarding heterogeneous devices, multiplexing data from each of these devices, and routing the data through reconfigurable processing logic for processing and transmission to one or more destination applications. The wireless communication network 28 may be any available type of network, including a combination of public distributed computing networks (e.g., Internet) and secured private networks (e.g., local area network, wide area network, virtual private network). It may also include wireless and wireline transmission systems (e.g., satellite, cellular network, terrestrial networks, etc.). Most if not all data transaction functions may be conducted, for example, over a wireless network, such as a wireless local area network (WLAN) or cellular data network operating, for example, according to a 4G, 5G, LTE, LPWAN, LTE-M, CAT-M1, or NB-IoT protocol.

As further illustrated in FIG. 1, the patient monitoring system 26 generally includes an implantable smart fixation device 40 and an external (extracorporeal) wireless reader 42 for interfacing with the smart fixation device 40. The external wireless reader 42 is configured to wirelessly receive data from the smart fixation device 40 through the skin of the patient, for example, via a radio frequency (RF) data communication means such as RFID or NFC. In at least some embodiments, the external wireless reader 42 may further be configured to wirelessly provide a source of power to the smart fixation device 40, which may enable the fixation device 40 to not require internal batteries to operate.

Referring to FIG. 2, the implantable smart fixation device 40 may include a rigid bone plate 12 that is configured to be secured across and to opposing sides of a bone fracture 50 using plurality of permanent fixation members such as bone screws 14. The position of the bone plate relative to the fraction will vary depending upon the location of the fracture, the geometry of the bone plate, and the specific bone being repaired. The bone plate 12 can be formed from any suitable implantable material such as, without limitation, a metal (e.g., a titanium alloy) or a polymer such as polyether ether ketone (PEEK). While the present disclosure generally discusses the use of the remote monitoring technology in connection with a bone plate style fixation device, the present technology may also be utilized with other rigid fixation members, such as implantable rods, pedicle screws, intervertebral implants, and the like.

The smart fixation device 40 may generally include at least one primary load sensor 52 that is operative to sense the load carried by the plate at the fracture 50. As the fracture heals/ossifies, the amount of load carried by the plate 12 at the fracture 50 should decrease (i.e. while the load carrying capacity of the healing bone correspondingly increases). In many embodiments, the smart fixation device may further include at least one reference load sensor 54 that is operative to sense the load carried by the plate 12 at a location that is spaced apart from the fracture. The reference load sensor 54 may generally serve as a baseline for the amount of load carried by the plate 12 adjacent to healthy or unfractured bone.

In one configuration, each load sensor 52, 54 may include one or more strain gauges 60 that have an electrical property that varies in an established manner with an amount of strain experienced by the gauge/plate at that location. Examples of suitable strain gauges include resistive strain gauges, capacitive strain gauges, piezoelectric materials, electroactive polymer materials, and the like. Each strain gauge 60 may be held in firm, rigid contact with the plate 12 such that any bending or flexure of the plate is also experienced by the gauge. As is well established, strain and load are directly proportional and thus measuring strain is one way of monitoring the load carried by the plate.

With continued reference to FIG. 2, the smart fixation device 40 further includes communication circuitry 62 that is electrically coupled with each strain gauge 60, and an antenna 64 in communication with the communication circuitry 62. The communication circuitry 62 is configured to receive the measurement value from the strain gauge 60 and provide the measurement value to the antenna 64 in a suitable form for wireless transmission. The communication circuitry 62 can include a wireless transmitter or transponder that receives the measurement value from the strain gauge 60 and prepares the measurement value for wireless transmission. For example, the communication circuitry 62 can include processing components such as (without limitation) one or more of (i) memory configured to store the measurement value, (ii) a digital-to-analog converter configured to convert the measurement value to analog format, (iii) a radio-frequency (RF) modulator configured to modulate the measurement value, (iv) an error-correction encoder configured to encode the measurement value, and other processing consistent with the wireless technology employed by the system.

In one example, the communication circuitry 62 can be configured as a passive radio-frequency identification (RFID) transponder. Alternatively, the communication circuitry 62 can be configured using any other wireless communication technology suitable for communicating through the skin such as (without limitation) battery-assisted passive RFID, active RFID, Bluetooth, and Wi-Fi. The communication circuitry 62 can further include a unique identifier (ID) that can be used to distinguish each load sensor from other sensors. In one example, the unique ID can be an ID of an RFID tag. The antenna 64 is configured to convert an electrical signal corresponding to the measurement value from the communication circuitry 62 into radio waves so as to transmit the measurement value wirelessly through the patient's skin to the external wireless reader 42 situated outside of the patient's body.

As further illustrated in FIG. 2, the smart fixation device 40 can include a power device 66 configured to supply power to the strain gauges 60 and communication circuitry 62. In at least some examples, the power device 66 can include an energy harvesting device configured to capture energy from a suitable energy source that is separate from the smart fixation device 40. For example, the energy source can be radio waves communicated from the external wireless reader 42. Alternatively, the power device 66 can capture energy from the patient's body itself or from another external source such as a source external to the patient's body. More broadly speaking, the energy source can include (without limitation) sensed kinetic energy, electric fields, magnetic fields, and so on. In a preferred embodiment, however, the power device 40 does not include a typical electrochemical battery.

In one configuration, each load sensor 52, 54 may have its own dedicated communication circuitry 62, antenna 64, and/or power device 66 that is local to that respective load sensor (i.e., as an integrated package). In this configuration, the primary load sensor 52 may transmit a first wireless signal indicative of the amount of strain monitored by the primary load sensor 52 (i.e., a primary strain value), while the reference load sensor 54 may simultaneously transmit a second wireless signal indicative of the amount of strain monitored by the reference load sensor 54 (i.e., a reference strain value). In other embodiments, the smart fixation device 40 may have common communication circuitry 62, antenna 64, and/or power device 66 that may be shared across the entire device 40 (i.e., with each load sensor 52, 54 in electrical communication with the shared communication circuitry 62, antenna 64, and/or power device 66). Further embodiments and disclosure of a smart fixation device 40 is provided in US 2019/0038214, which is incorporated by reference in its entirety herein and for all purposes.

Figure 3:
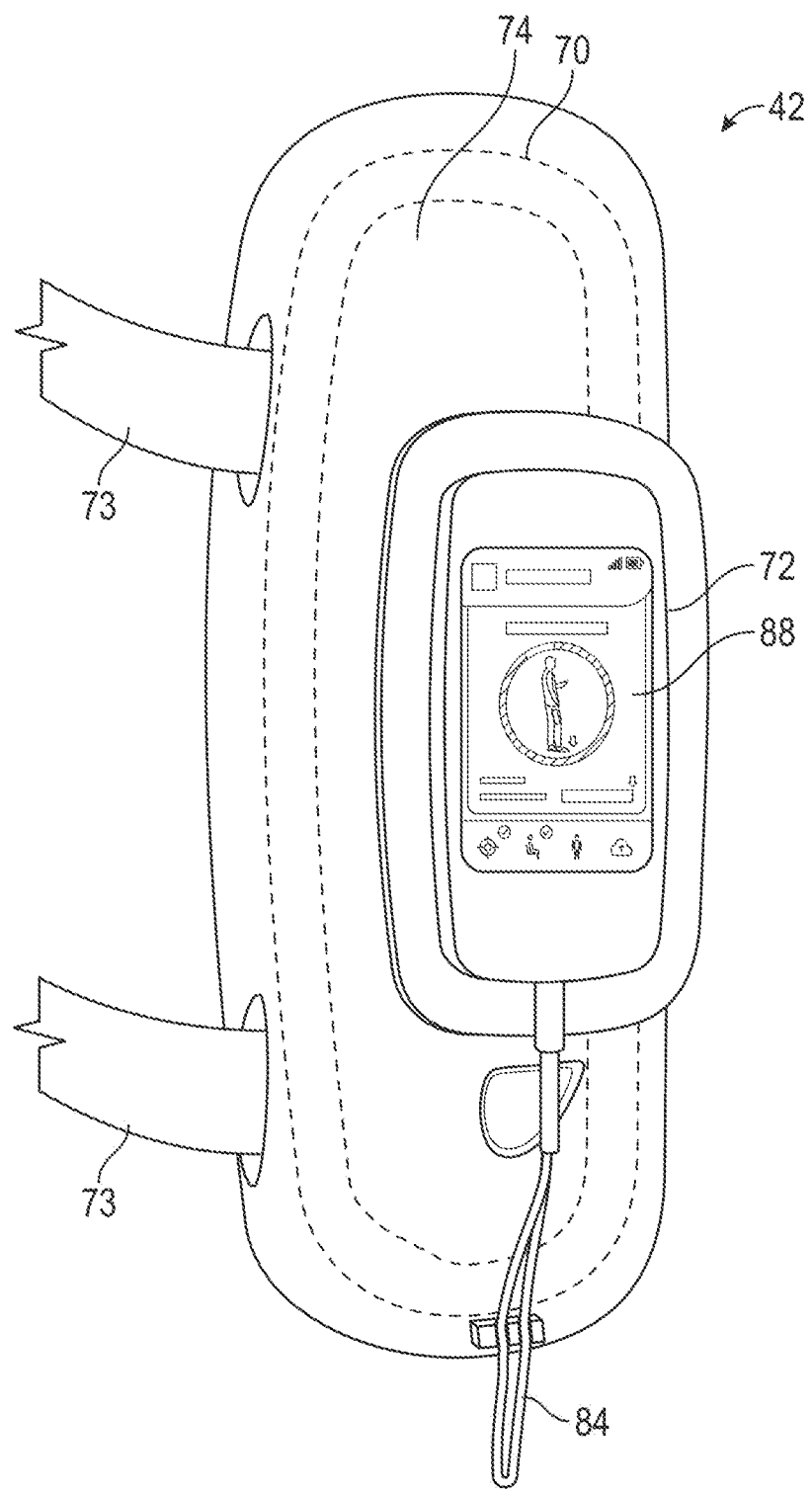
FIG. 3 is a schematic side perspective view of an external wireless reader for wirelessly interfacing with an implantable smart fixation device.

As noted above, the external wireless reader 42 is configured to wirelessly receive data from the smart fixation device 40 through the skin of the patient. To facilitate these communications, as generally shown in FIG. 3, the external wireless reader 42 generally includes one or more antenna 70, such as a Radio Frequency Identification (RFID) antenna, in communication with a portable computing device 72. The antenna 70 may be configured to be attached directly to an external surface of the patient's body or clothing. This attachment may be facilitated by the use of one or more straps 73, harnesses, braces, adhesive patches, elastic sleeves, cuffs, and the like. In one particular embodiment, the antenna 70 may be provided within a flexible fabric carrier 74 that may be particularly suited to contour to the user's body. The antenna 70 may generally include a looped coil that has a length adapted to extend parallel to the bone plate 12 and a width adapted to extend transverse to and/or circumferentially around the bone plate 12. The length may control the amount of the plate that the antenna can communicate with, while the width may affect the depth of tissue through which the antenna receives reliable signals. In one configuration, the length of the antenna 70 is greater than the distance between the primary load sensor 52 and the reference load sensor 54. In another configuration, the length of the antenna 70 is at least 10% greater than the distance between the primary load sensor 52 and the reference load sensor 54. In one embodiment, the antenna 70 may have a length of between about 20 cm and about 50 cm, or between about 25 cm and about 40 cm. Likewise, the antenna 70 may have a width of between about 12 cm and about 20 cm or between about 14 cm and about 17 cm.

Figure 4:
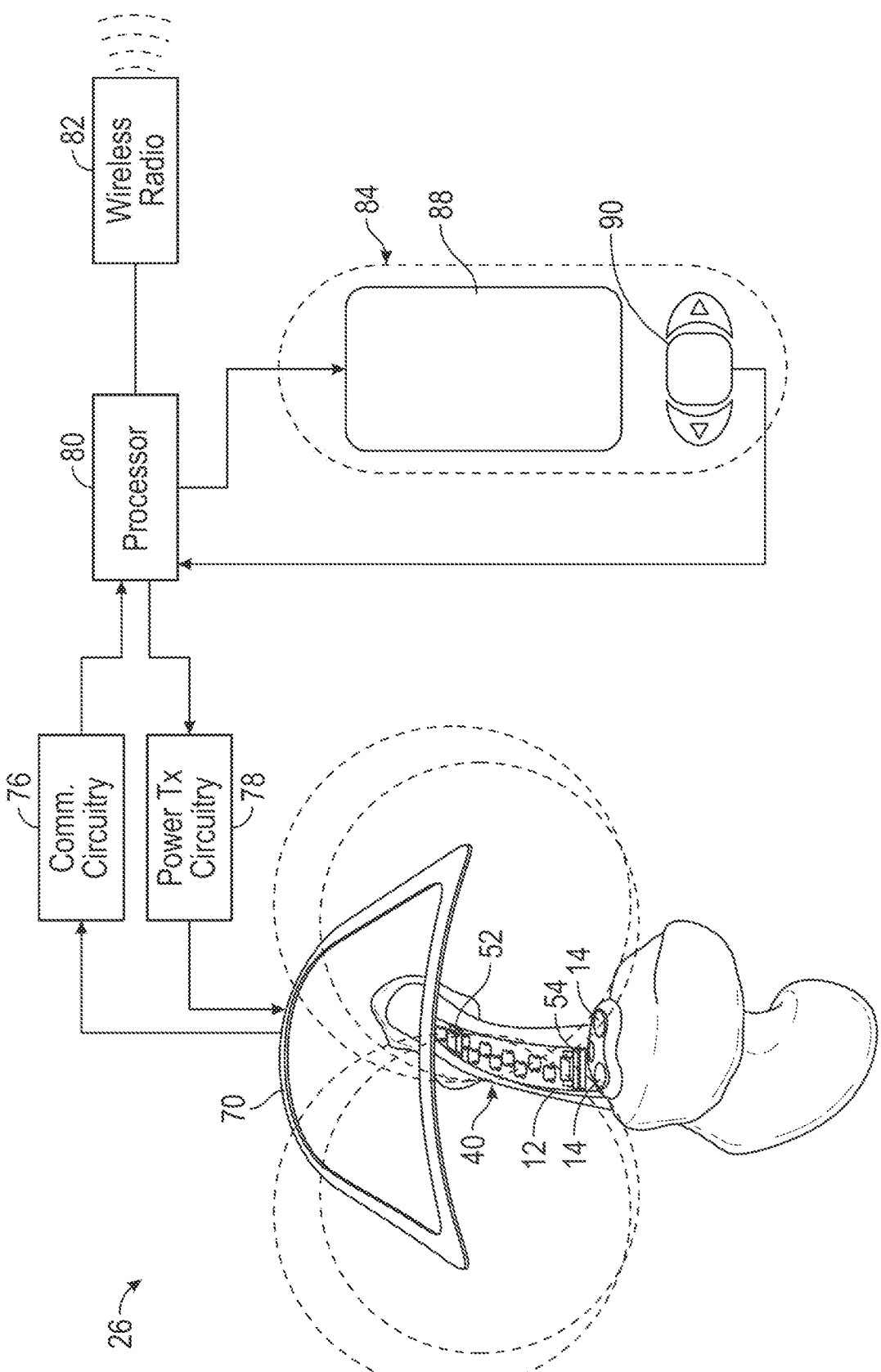
FIG. 4 is a schematic diagram of a portable computing device wirelessly communicating with an implantable smart fixation device via an extracorporeal antenna.

As illustrated in FIG. 4, the portable computing device 72 may include short-range communications circuitry 76 and/or power transmission circuitry 78 in communication with antenna 70. The short-range communications circuitry 76 may be operative to receive digital information from the smart fixation device 40 via the antenna 70. In some embodiments, the short-range communications circuitry 76 may include a digital receiver or transceiver such as an RFID transceiver or Near Field Communications (NFC) transceiver. In one configuration, the antenna 70 may operatively communicate with each load sensor 52, 54 simultaneously, for example, through the use of different data transmission frequencies or through the use of differing digital identifiers that are provided with the strain data. The power transmission circuitry 78 can include an inductive charging circuit that is operative to supply electro-magnetic power via the antenna 70 (i.e., an alternating magnetic field) to inductively power the smart fixation device 40.

With continued reference to FIG. 4, the portable computing device 72 (see FIG. 3) may further include a processor 80, a wireless communications radio 82, and a user interface 84. The wireless communications radio 82 may be operative to communicate with and over the wireless communication network 28, and may include a BLUETOOTH or BLUETOOTH LOW ENERGY chipset, an ultrawideband (UWB) chipset, a Wi-Fi radio operative to digitally communicate using a communications protocol according to the IEEE 802.11, or a cellular radio operative to communicate according to a 4G, 5G, LTE, LPWAN, LTE-M, CAT-M1, NB-IoT protocol, or the like. In some embodiments, the portable computing device 72 may further include a subscriber identity module (SIM) card to facilitate communications over a cellular network.

The processor 80 may be embodied as one or multiple digital computers, data processing devices, and/or digital signal processors (DSPs), which may have one or more microcontrollers or central processing units (CPUs), read only memory (ROM), random access memory (RAM), electrically-erasable programmable read only memory (EEPROM), a high-speed clock, analog-to-digital (A/D) circuitry, digital-to-analog (D/A) circuitry, input/output (I/O) circuitry, and/or signal conditioning and buffering electronics. The processor 80 is configured to execute or perform one or more electronic functions through the execution of software or firmware code stored in non-volatile memory that is accessible by the processor 80. For example, the processor 80 may be capable of executing code that reads one or more strain values from the smart fixation device 40, that selects an average or filtered representative strain value, that communicates with the user via the user interface 84, and/or that communicates over the wireless communication network 28 via the wireless communications radio 82. The user interface (84) may include data processing devices, and/or digital signal processors (DSPs), which may have one or more microcontrollers or central processing units (CPUs), read only memory (ROM), random access memory (RAM), electrically-erasable programmable read only memory (EEPROM), a high-speed clock, analog-to-digital (A/D) circuitry, digital-to-analog (D/A) circuitry, input/output (I/O) circuitry, and/or signal conditioning and buffering electronics.

The portable computing device 72 may be in communication with the antenna 70 through the use of either a wired or wireless communication link. In one configuration, such as generally shown in FIG. 3, the portable computing device 72 may be electrically coupled to the antenna 70 through the use of a wired tether (not shown). Such a design may have the benefits of providing a self-contained diagnostic apparatus that only relies on a single power source. More specifically, absent the wired tether, the antenna 70 would need a first power source to enable/power communications with both the sensor and the portable computing device 72, while the portable computing device 72 would need a second power source. Coupling the two elements reduces the need for a consumer to maintain sufficient battery levels on two separate devices, while also reducing device complexity and overall size. The wired tether also enables the portable computing device 72 to be held in a convenient and accessible location during the data acquisition without the need for a strained posture to view a screen that may otherwise be out of the patient's view. In one configuration, the antenna portion of the device may further include a holster or other securing mechanism for attaching and securing the portable computing device 72 when not in use.

In another embodiment, the portable computing device 72 maybe in wireless communication with a smart phone or tablet using a suitable wireless protocol.

Figure 5:
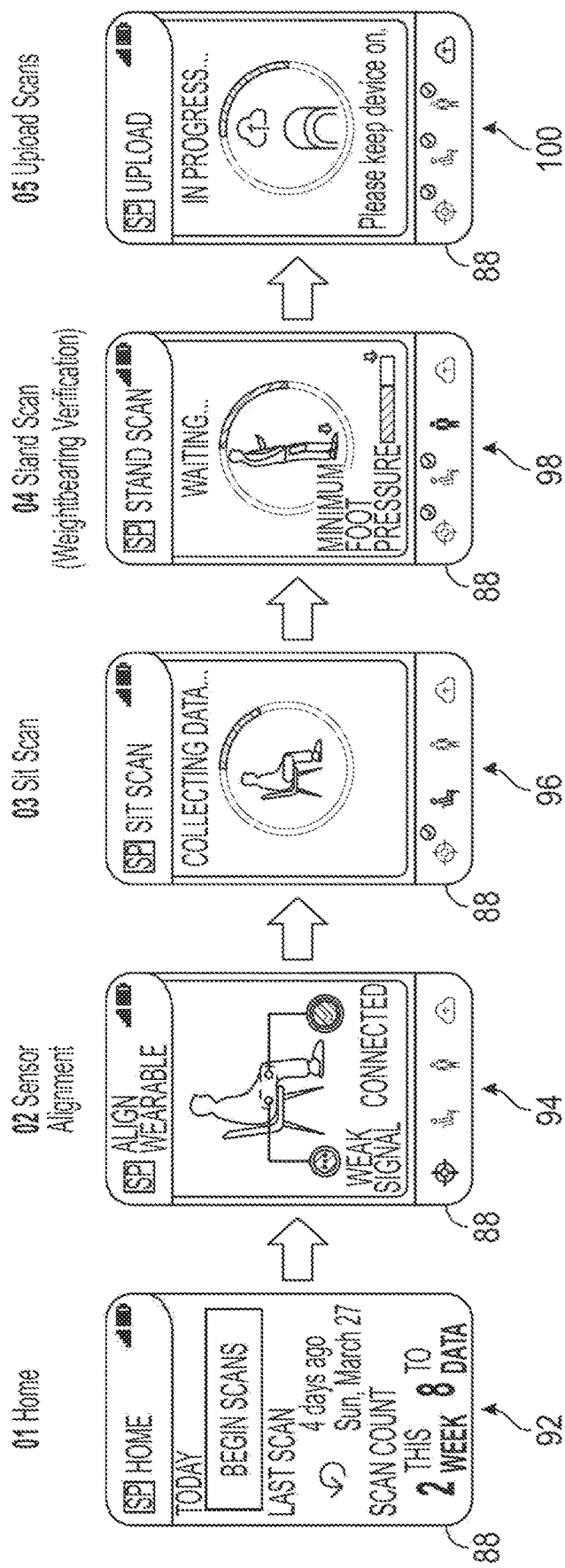
FIG. 5 is a schematic illustration of a progression of user interface display screens that may be displayed to a patient via a portable computing device, such as shown in FIGS. 3-4, during a measurement.

As further illustrated in FIG. 4, the user interface 84 may include a visual display 88, such as an LCD or OLED display, and one or more input devices 90 such as button or touch-screen digitizer. As generally shown in FIG. 5, the display 88 may be operative to provide one or more visual cues to the patient, such as indicating the start of a reading (at 92), verifying sensor alignment (at 94), instructing a posture for and occurrence of a reference measurement (at 96), instructing a posture for and occurrence of a load-bearing measurement (at 98), and/or the uploading of measurement data to the data server/cloud via the wireless communication network 28 (at 100). The display 88 may include other sensors such as a load sensor, accelerometer, temperature sensor, or any other sensor that measures a value of interest.

Figure 6:
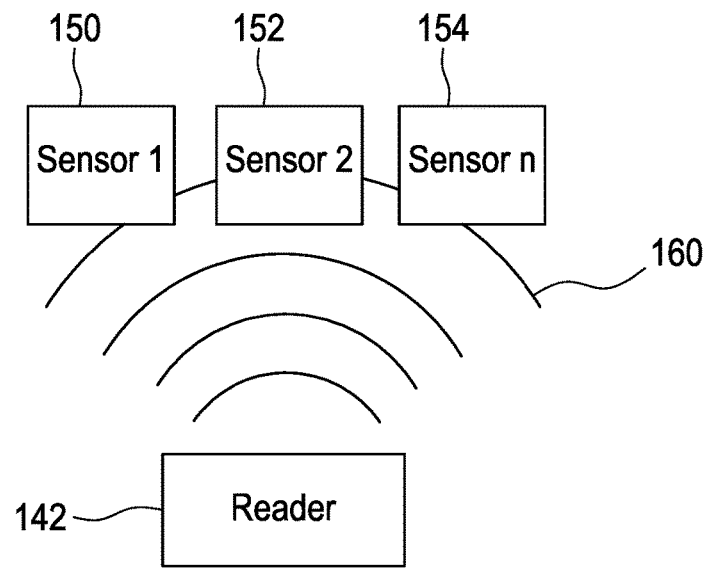
FIG. 6 illustrates a reader reading the data from n sensors.
Figure 7:
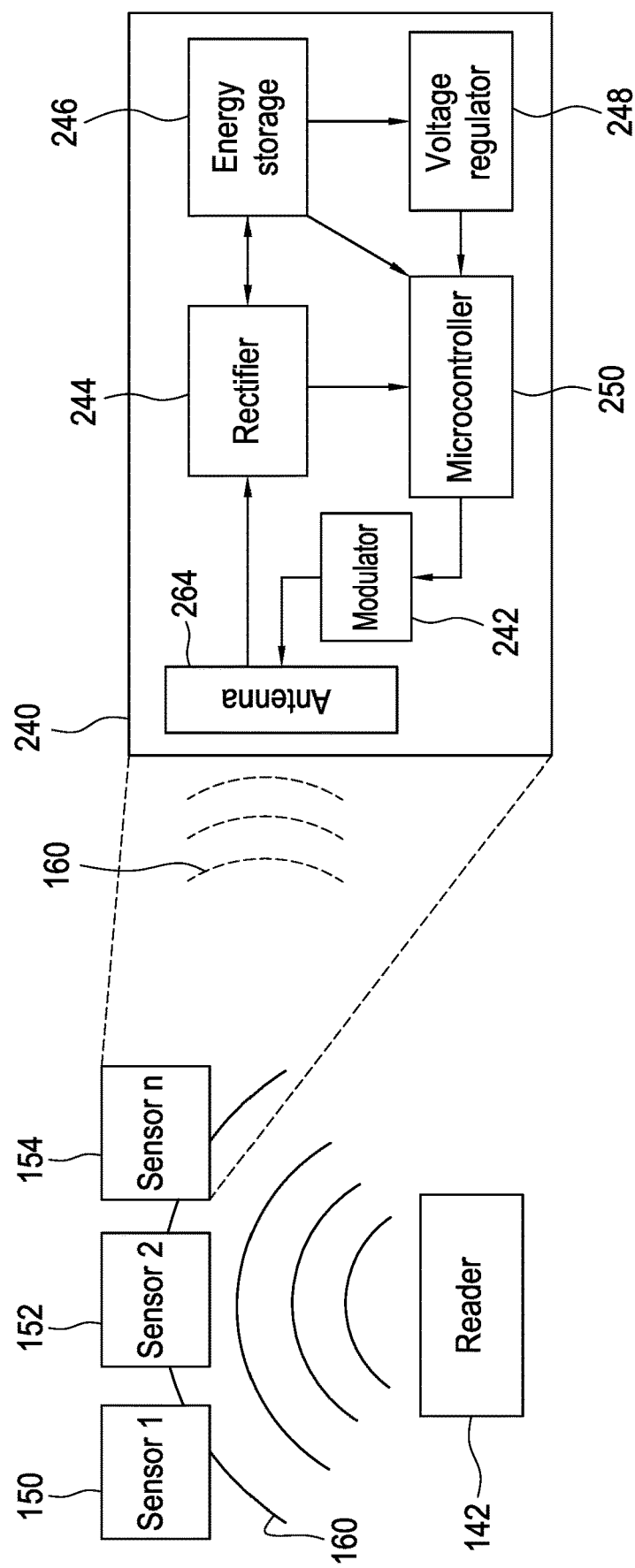
FIG. 7 illustrates the reader and sensors as shown in FIG. 6 along with a block diagram of the sensors.

As described above, the bone plate may have multiple sensors that may be read by a single reader. FIG. 6 illustrates a reader reading the data from n sensors. The reader 142 transmits an RF amplitude modulated signal 160 that provides power to the sensors 150, 152, 154. While amplitude modulation is described, other types of modulation may be used including but not limited to frequency modulation, pulse width modulation, phase modulation, load modulation, phase-shift keying modulation, frequency-shift keying, amplitude-shift keying, quadrature amplitude modulation, etc. The sensors described above were primary load sensors, but the sensors 150, 152, 154 may be one or more of a load sensor, accelerometer, temperature sensor, or any other sensor that measures a value of interest. As the data from the multiple sensors 150, 152, 154 may need to be read at the same time, the sensors 150, 152, 154 need to communicate with the reader 142 without interference. FIG. 7 illustrates the reader and sensors as shown in FIG. 6 along with a block diagram of the sensors. The sensors may include an antenna 264, a rectifier 244, an energy storage 246, a voltage regulator 248, a microcontroller 250, and a modulator 242. The antenna 264 may be a coil antenna or any other sort of antenna capable of fitting in the sensor's small form factor. The sensor receives an RF amplitude modulated signal 160 from the reader 142 The rectifier 244 rectifies the received signal and the rectified signal is used to store energy on the energy storage 246. The energy storage 244 may be a small rechargeable battery, capacitor, or any other energy storage device. As the received signal 160 is pulsed (i.e., having an on-time and an off-time and a duty cycle) the energy storage 246 is capable of storing enough energy from a pulse to power the operation of the senor until the next pulse is received. A voltage regulator 248 is connected to the energy storage 246 and regulates a supply voltage used to power the microcontroller 250. The microcontroller 250 controls the operation of the sensor including controlling sensing elements in the sensor, collecting data from the sensing elements, processing the data from the sensing elements, and facilitating the transmission of the sensed data back to the reader 142. The microcontroller 250 may control a modulator 242 that generates a modulated signal that is transmitted by the antenna 264 back to the reader 142. The modulated signal modulates the data from the sensing element onto a carrier signal.

Figure 8:
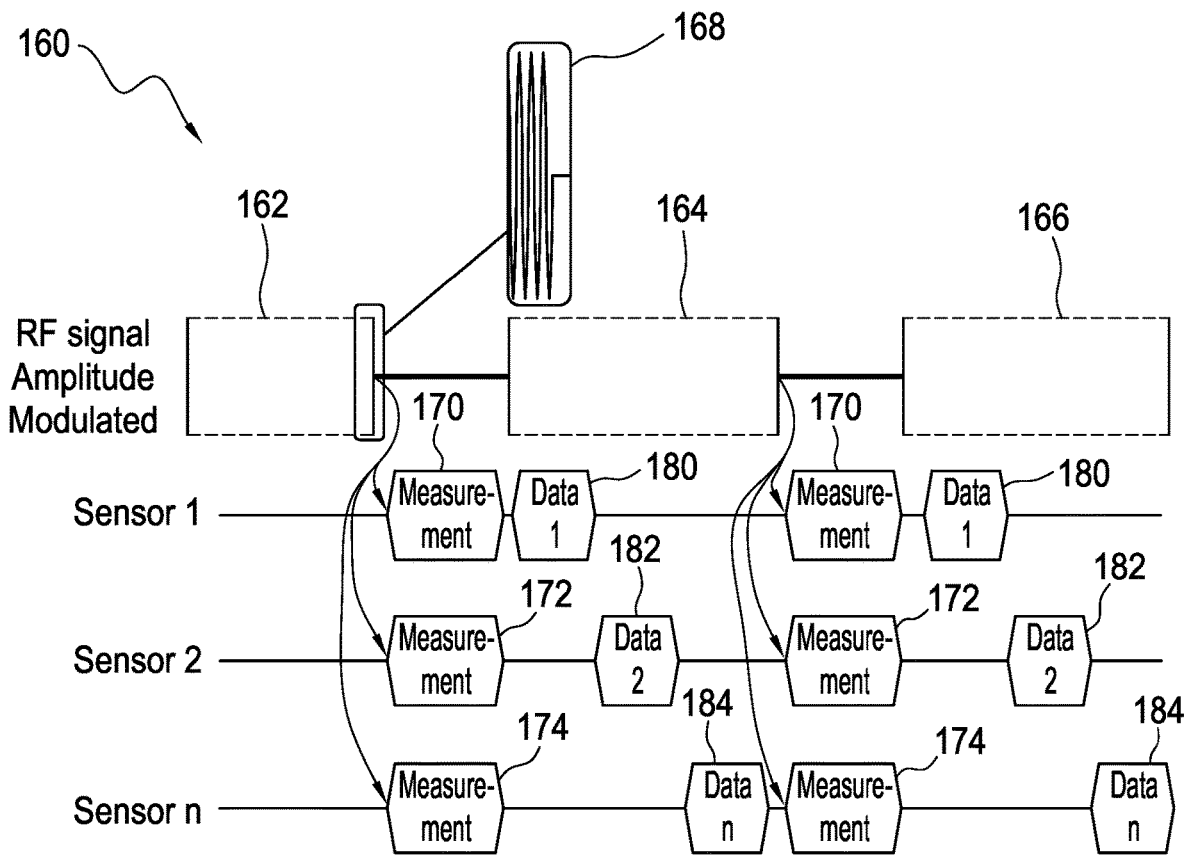
FIG. 8 illustrates an RF signal transmitted by the reader to query the sensors and the timing of the sensor's data transmission back to the reader.

FIG. 8 illustrates an RF amplitude modulated signal transmitted by the reader to query the sensors and the timing of the sensor's data transmission back to the reader. The RF amplitude modulated signal 160 is transmitted by the reader 142. The transmitted signal 160 may provide power to the sensors 150, 152, 154. When the falling edge of the transmitted signal 168 at the end of the on-time is sensed, the sensor then performs a measurement 170, 172, 174 and processes the measured data. Then when the next pulse of the transmitted signal 160 is received and the rising edge of the on-time is detected, each sensor transmits its sensed data 180, 182, 184 to the reader 142. In order to prevent collisions among the data transmitted by each of the sensors 150, 152, 154, each sensor has a specific time window in which to transmit its sensor data 180, 182, 184. Thus the data transmitted by each of the sensors 150, 152, 154 is time division multiplexed. The data transmitted by each sensor may be identified as associated with a specific sensor based upon the specific time window used. Alternatively, a specific sensor ID may be transmitted as part of the sensor data 180, 182, 184. Accordingly, the on-time of the pulses in the transmit signal 160 need to be long enough to allow for the sensor data 180, 182, 184 from each of the sensors 150, 152, 154 to be transmitted as well as to provide enough power to the senor to carry out is various operations. Further, the off-time of the transmitted signal 160 may be selected to provide enough time for the sensor to measure the data. Depending upon the specific application, the duty of cycle of the transmitted signal may be long or short. The time division multiplexing of the sensors 150, 152, 154 transmission of sensor data 180, 182, 184 allows for a single reader 142 to read multiple sensors associated with a bone plate.

One challenge in reading data from the sensors is to find the optimal alignment of the reader 142 with the sensors 150, 152, 154. This alignment is important when the sensors 150, 152, 154 are powered inductively using the transmit signal 160, as proper alignment will maximize the power received by the sensors 150, 152, 154. If the reader is not properly aligned, the sensors 150, 152, 154 may not receive enough energy to operate properly.

This alignment problem may be solved by measuring the rectified voltage received by each of the individual sensors 150, 152, 154 and sending these values back to the reader 142. The reader 142 will include a profile of the desired voltages for each of sensors 150, 152, 154 that indicate proper alignment of the reader. The reader can then compare the measured voltages to the profile and determine if the reader is properly aligned. If not, then the reader may generate an instruction to the user of the reader to move the reader in a specific direction. In one embodiment the reader's (142) sensors shall be used to confirm the direction that the patient was moving the reader (142). The reader then receives updated voltages from each sensor and updates the instructions to the user until the reader is properly positioned within a certain tolerance level.

Figure 9:
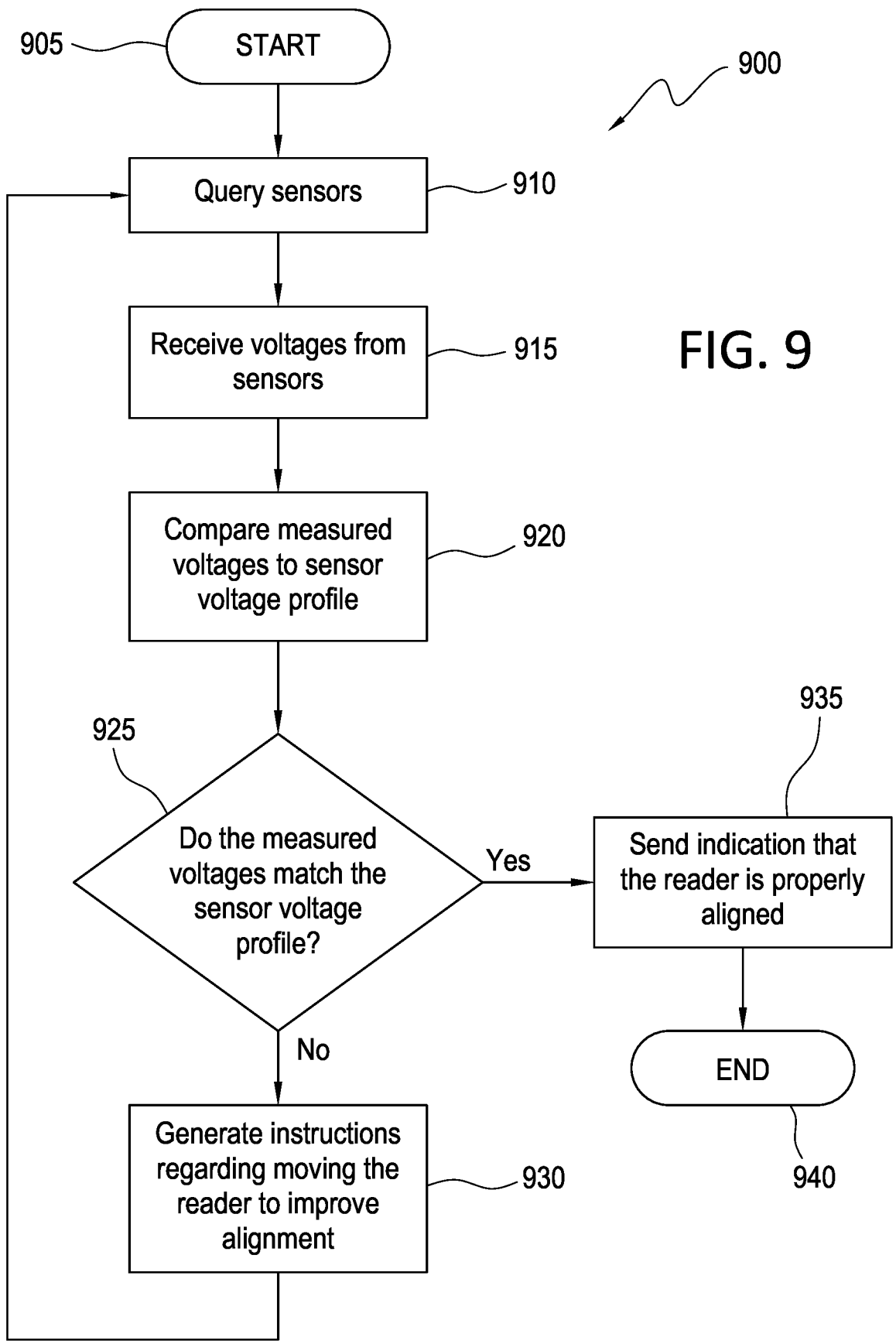
FIG. 9 illustrates a method of aligning the reader with the sensors.

FIG. 9 illustrates a method of aligning the reader with the sensors. The method 900 starts 905 and then queries the sensors 910. This may be done by sending a specific signal by the reader to the sensors that the sensor recognizes as a voltage query request. Next, the sensors measure the voltage of the received query signal and communicate the measured voltage values to the reader 910. The reader then compares the measured voltages to a sensor voltage profile 920. Next, the reader determines if the measure voltages match the voltage profile 925. This may be done in various ways. For example, a weighted sum of the differences between each measured voltage and the profile voltage may be calculated, and this weighted sum may then be compared to a threshold value. When the sum is less than the threshold value, the reader is properly aligned, and the reader may send an indication to the user aligning the reader that the reader is properly aligned 935. This may be done using the user interface 84 on the visual display 88. When the sum is greater than the threshold value, then the reader may generate instructions regarding the moving of the reader to improve the alignment. For example, if there are three sensors in a row, the sensor voltage profile might indicate that the voltages when aligned would be 0.75 V, 1.0 V, and 0.75 V. If the voltages come back as 0.5 V, 0.75 V, and 1.0 V, this would indicate that the reader needs to be moved in a direction towards the first sensor. After the instructions are given, the method 900 again queries the sensors 910 and the process repeats until the reader is aligned. This iterative process provides the needed prompts to the user of the reader to get the reader properly aligned. In other embodiments, the reader may include motion sensing devices that may be used to help in the alignment process. They may help in determining the prompts to provide the user during alignment. It also may detect when no movement occurs after a prompt is given to the user, so that further instructions may be provided to the user or another indicator such causing a sound to be made to alert the user.

Localized temperature may be indicative of local inflammation or infection. Accordingly, the communication capability as found in the plates described herein may be used to facilitate measuring localized temperature to assess whether inflammation or infection is present around the bone plate. Early detection of inflammation or infection can lead to earlier treatment that leads to improved outcomes for the patient. For example, if the inflammation becomes severe it could lead to the need to explant the bone plate and waiting for a relaxation period before reimplanting the device, and early detection of the inflammation and infection can prevent this course of action.

One or more temperature sensors may be placed on the bone plate. The sensors may be standalone sensors or may be integrated with other sensors such as those described above. The sensors are then periodically queried to collect temperature information. This information may be analyzed by the reader and sent to the data server 20 for further analysis. Various algorithms may be applied to the temperature data to determine if inflammation or infection is indicated. Then the patient or the patient's medical provider may be alerted to the condition and the necessary treatment provided.

Figure 10:
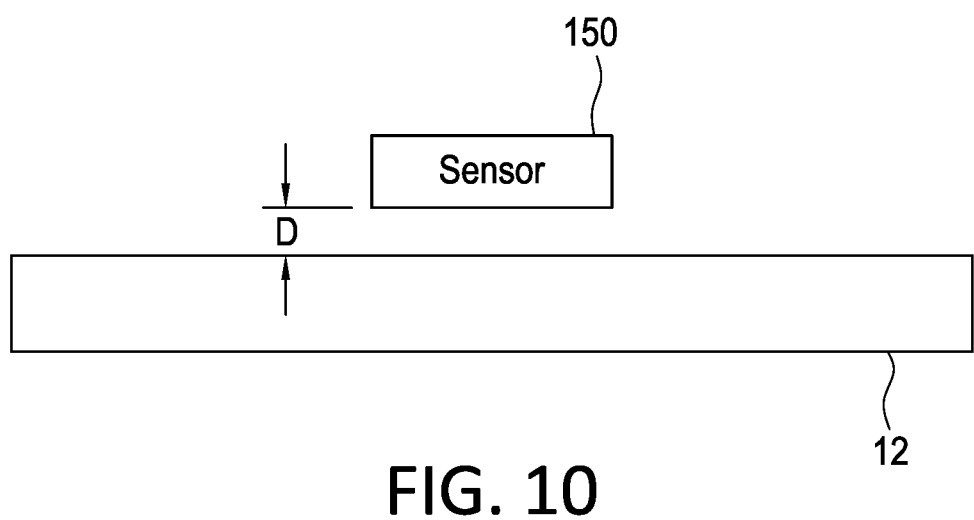
FIG. 10 illustrates the sensor a distance D from the bone plate.

The sensors use inductive powering based upon using a specific frequency and a resonator circuit. Because the bone plate is a large metallic object near the sensors, the bone plate can lead to a detuning of the resonator circuit that converts the RF signal to power. FIG. 10 illustrates the sensor 150 at a distance D from the bone plate 12. The detuning effect on the resonator circuit is based upon the distance between the sensor 150 and the bone plate 12. This will cause a frequency shift in the resonator circuit and lead to a reduction in power transmission. This may be overcome by selecting a distance D between the sensor 150 and the bone plate 12. At this distance, the detuning of the resonator circuit may be determined. The resonator circuit can then be designed so that when the sensor 150 is at a distance D from the bone plate 12, the detuning of the resonator circuit due to the presence of the bone plate 12 cause the resulting circuit to achieve a desired resonate frequency corresponding to the maximum power transfer. In order to ensure that the distance D is maintained between the bone plate 12 and the sensor 150, an electrical isolating material may be used as a barrier between sensor 150 and the bone plate 12. Other methods of fixing the sensor the specified distance D from the bone plate may be used as well.

While each of the embodiments are described above in terms of their structural arrangements, it should be appreciated that the invention also covers the associated methods of using the embodiments described above.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications and combinations of the various embodiments can be affected while remaining within the spirit and scope of the invention. Accordingly, the foregoing disclosure, description, and figures are for illustrative purposes only and do not in any way limit the invention, which is defined only by the claims.

What is claimed is:

1. A patient monitoring system, comprising:
a bone plate configured to be secured to a bone;
a plurality of sensors coupled to the bone plate, each sensor including a resonator circuit configured to harvest power from a first modulated RF signal, wherein the resonator circuit of each sensor is spaced apart from the bone plate by a distance,
wherein each sensor of the plurality of sensors is configured to:
measure a parameter value; and
transmit data signals communicating the measured parameter value in a time-division multiplexed manner such that each sensor of the plurality of sensors transmits data signals during a time period that does not overlap with any other time period during which any other sensor transmits data signals;
wherein
the transmitted data signals from the plurality of sensors are each transmitted at different non-overlapping times; and
an external wireless reader including an antenna, a processor, and wireless communication radio, wherein the external wireless reader is configured to:
transmit the first modulated RF signal to the plurality of sensors; and
receive the transmitted data signals from each sensor of the plurality of sensors at a different nonoverlapping time.

2. The patient monitoring system of claim 1, wherein the plurality of sensors are configured to be powered by energy harvested from the first modulated RF signal by their corresponding resonator circuits.

3. The patient monitoring system of claim 1, wherein
the plurality of sensors are configured to receive the first modulated RF signal from the external wireless reader,
the modulated RF signal has a periodic on-time and off-time, and
the plurality of sensors are configured to measure the parameter value when the falling edge of the on-time of the first modulated RF signal is detected.

4. The patient monitoring system of claim 1, wherein
the plurality of sensors are configured to receive the first modulated RF signal from the external wireless reader,
the first modulated RF signal has a periodic on-time and off-time, and
at least one sensor of the plurality of sensors is configured to transmit the data signals when the leading edge of the on-time of the first modulated RF signal is detected.

5. The patient monitoring system of claim 1, wherein the plurality of sensors measure one of load, temperature, and position.

6. The patient monitoring system of claim 1, wherein each sensor of the plurality of sensors further comprises:
an antenna configured to receive the first modulated RF signal from the external wireless reader;
a controller configured to control the sensor; and
a modulator configured to produce a data signal to be transmitted.

7. The patient monitoring system of claim 6, wherein the plurality of sensors further comprise:
a rectifier configured to rectify the first modulated RF signal; and
an energy storage configured to store energy from the rectifier.

8. The patient monitoring system of claim 1, wherein
the plurality of sensors measure a voltage based upon a received first modulated RF signal and transmit the measured voltage value to the external wireless reader, and
wherein the external wireless reader is configured to:
receive the measured voltage values from the plurality of sensors;
compare the received voltage values to a sensor voltage profile; and
generate instructions regarding moving the external wireless reader to improve the alignment between the plurality of sensors and the external wireless reader.

9. The patient monitoring system of claim 8, wherein the external wireless reader is configured to display the instructions regarding moving the external wireless reader on a display.

10. The patient monitoring system of claim 1, wherein
the plurality of sensors are configured to measure temperature, and
the external wireless reader is configured to detect the presence of inflammation or infection based upon the temperature measurements.

11. The patient monitoring system of claim 1, further comprising:
   an electrically insulating layer disposed between each resonator circuit and the bone plate.

12. The patient monitoring system of claim 1, wherein each sensor of the plurality of sensors is further configured to transmit a sensor identification (ID) that is specific to each sensor of the plurality of sensors.

* * * * *